Patented Apr. 29, 1930

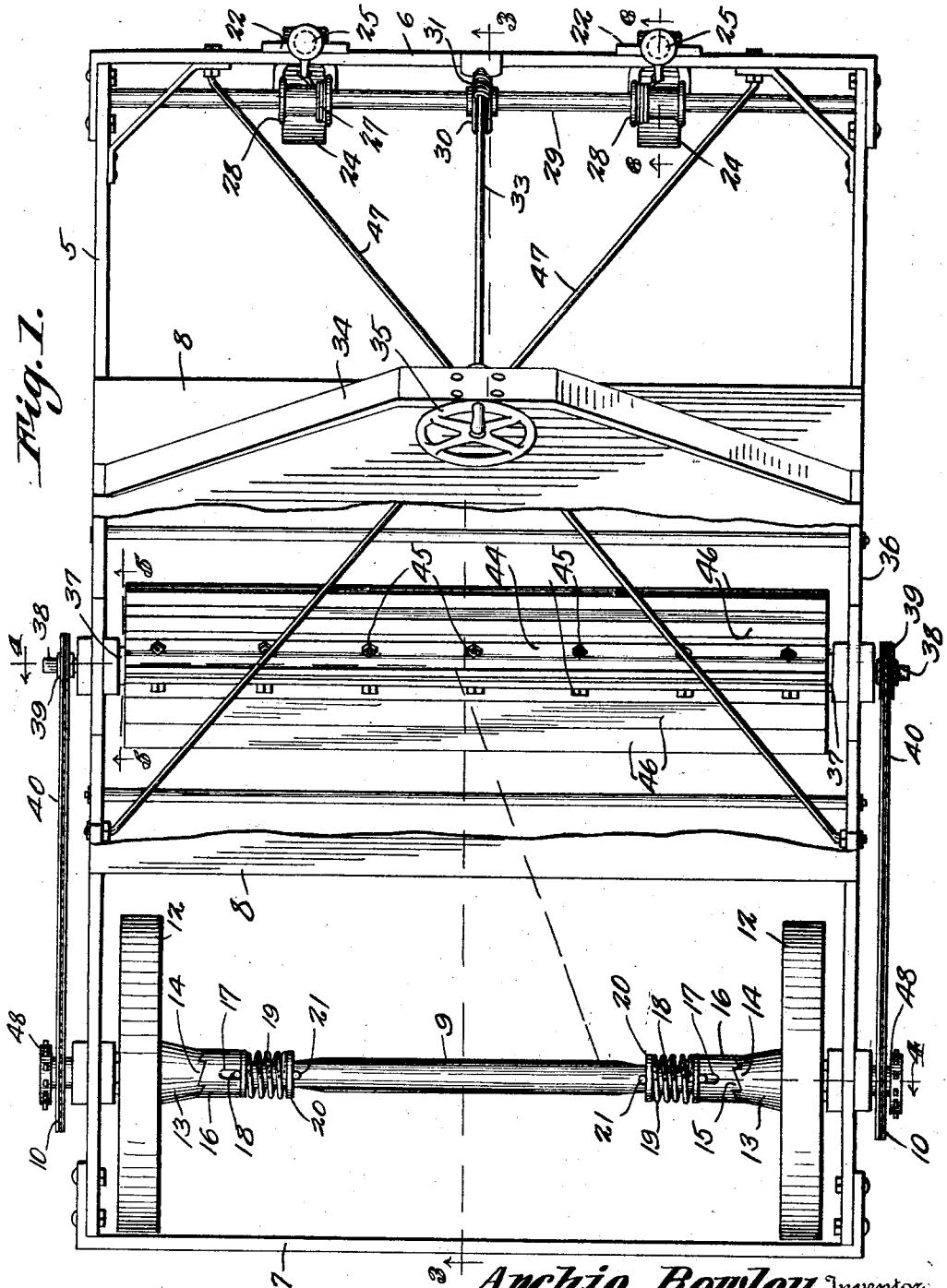

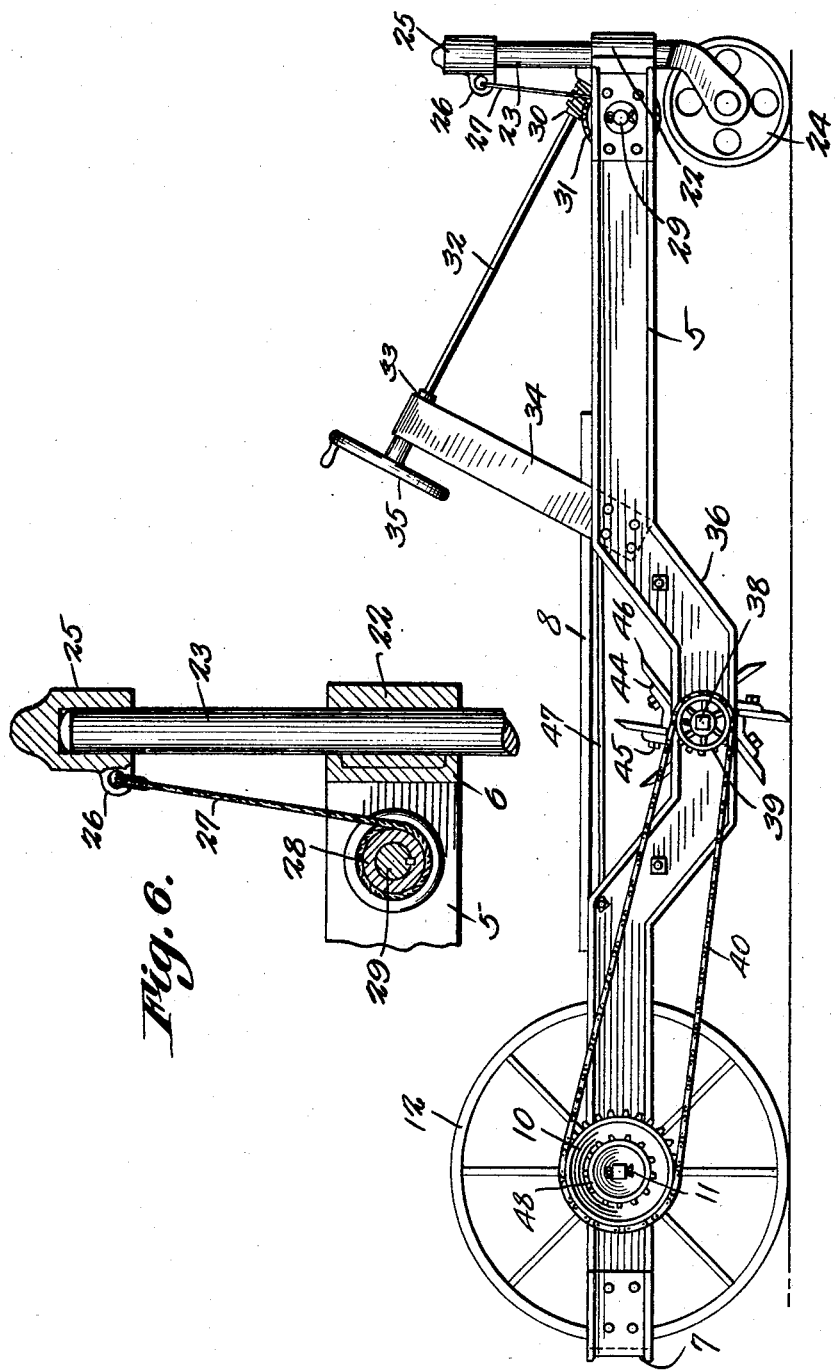

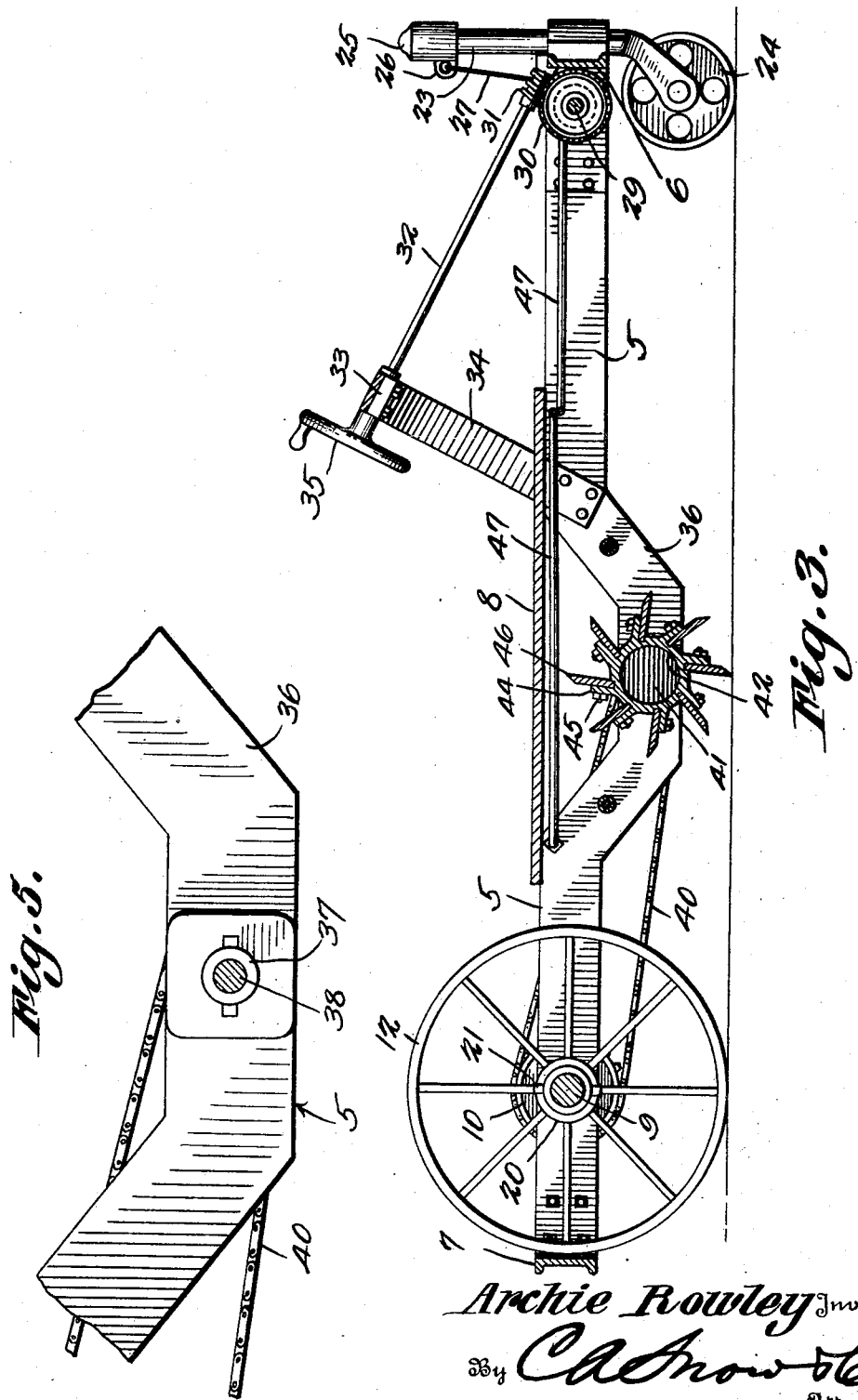

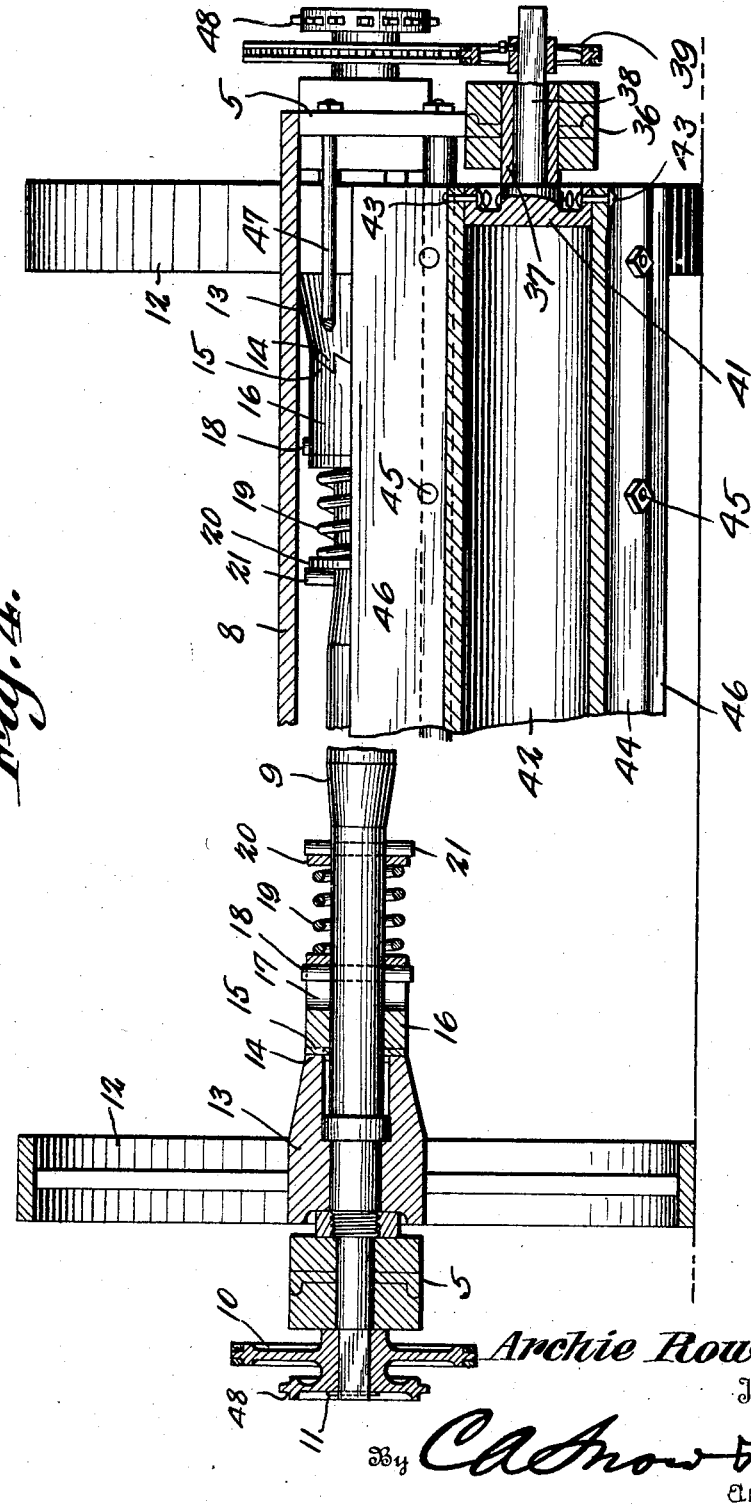

1,756,495

UNITED STATES PATENT OFFICE

ARCHIE ROWLEY, OF HAVRE, MONTANA

WEEDER

Application filed January 31, 1929. Serial No. 336,525.

This invention relates to agricultural machines, and more particularly to a machine especially designed for conditioning the ground surface for cultivation.

The primary object of the invention is to provide a machine for removing weeds by the chopping operation, so that further growth of the weeds will be prevented and the cut weeds may be readily plowed under, should it be desired to do so.

Another object of the invention is to provide a machine of this character including a knife carrying cylinder, novel means being provided for adjusting the cylinder with respect to the ground surface, adapting the device for use in treating weeds of various heights.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a plan view of a machine constructed in accordance with the invention.

Figure 2 is a side elevational view thereof.

Figure 3 is a sectional view taken on line 3—3 of Figure 1.

Figure 4 is a sectional view taken on line 4—4 of Figure 1.

Figure 5 is a sectional view taken on line 5—5 of Figure 1.

Figure 6 is a sectional view taken on line 6—6 of Figure 1.

Referring to the drawings in detail, the machine includes a frame embodying side bars 5, front and rear bars 6 and 7 respectively and a platform 8 which is secured to the side bars and on which a person may stand to regulate or adjust the frame with respect to the ground surface.

The reference character 9 designates the main supporting axle of the machine, which extends through bearings in side bars of the frame, the ends thereof extending beyond the side bars of the frame as clearly shown by Figure 4 of the drawings, where the ends are squared so that the sprockets 10, which are provided with square openings, may be positioned on the axle to rotate therewith. Pins 11 extend through the ends of the axle to prevent the sprockets from moving longitudinally of the axle.

Wheels 12 are mounted on the axle and are provided with hubs 13 that extend inwardly appreciable distances, the inner faces of the hubs being provided with teeth 14 that cooperate with teeth 15 of the clutch member 16 that are positioned on the axle to move longitudinally thereof and at the same time rotate with the axle. As clearly shown by Figure 4 of the drawings these clutch members 16 are provided with elongated openings 17 that accommodate pins 18 which extend through the axle. Coiled springs 19 are also positioned on the axle and bear against the washers 20 that are held in position by means of pins 21. Thus it will be seen that the springs 19 normally act to urge the clutch members 16 into close engagement with the hubs 13 of the wheels 12 so that as the wheels 12 are rotated by their contact with the ground surface, the axle will be rotated, that is, when the machine is being moved forwardly, but when the machine is moved rearwardly, the teeth of the hubs will slide over the clutch members 16, allowing the wheels to rotate on the axle.

At the forward end of the machine are bearings 22 that accommodate the vertical shafts 23 which are of lengths to extend appreciable distances above the frame of the machine. Wheels 24 are supported at the lower ends of the shafts 23 to support the forward end of the machine. Mounted on the upper ends of the shafts 23 are caps 25 which have laterally extended ears 26 formed with openings to receive the upper ends of the cables 27, which cables have their opposite ends wound on the drums 28 that are keyed to the shaft 29 mounted adjacent to the shafts 23.

Disposed on the shaft 29 and arranged at a point intermediate the ends thereof, is a gear 30 that meshes with the worm 31 secured to the lower end of the shaft 32 so that as the shaft 32 is rotated, the shaft 29 will be rotated to wind or unwind the cables 27 which will result in a vertical movement of the forward end of the frame of the machine, for purposes to be hereinafter more fully described.

The upper end of the shaft 32 is mounted in the bearing 33 that is supported in the bar 34. An operating wheel 35 is mounted on the upper end of the shaft 32 and affords means whereby the operator may readily rotate the shaft 32 to wind or unwind the cables to raise or lower the frame of the machine.

As shown by Figure 3 of the drawings, the side bars of the frame are provided with downwardly extended portions 36 which are supplied with bearings 37 in which the shafts 38 operate, the shafts 38 being supplied with sprockets 39 over which the chains 40 operate, the chains 40 also operating over the sprockets 10 so that movement of the axle 9 will be transmitted to the shafts 38.

Heads 41 are provided at the inner ends of the shafts 38 and are secured within the ends of the cylinder 42, as by means of the rivets 43. Formed integral with the cylinder and extending therefrom, are flanges 44 that are provided with openings to receive the bolts 45 which also pass through openings in the blades 46 to secure the blades 46 in position on the cylinder.

Grooves are formed in the cylinder adjacent to the flanges 44, which grooves accommodate the inner edges of the blades 46 to secure the blades and relieve the bolts 45 of undue strain. Brace rods 47 extend across the frame of the machine to brace the frame. Sprockets 48 are secured to the axle 9 at the outer extremities of the axle and provide means whereby a power chain may operate to rotate the axle 9, should it be desired to do so.

The operation of the machine is as follows:

The machine is connected with a suitable power device, and is positioned adjacent to one end of a field in which growing weeds or similar vegetation is to be cut.

The machine is now moved along the ground surface, and the operator standing on the platform 8 will of course operate the shaft 32 to adjust the frame so that the blades 46 of the cylinder or rotary cutter will operate in such proximity to the ground surface that the weeds will be rolled down and cut by the sharp edges of the blades to kill the vegetation.

I claim:

An agricultural machine including a frame, wheels for supporting the rear end of the frame, bearings at the forward end of the frame, elongated shafts extending through the bearings, wheels at the lower ends of the elongated shafts, said bearings adapted to slide over the elongated shafts, a shaft supported within the frame, drums on the shaft, cables wound on the drums, means for anchoring the cables to the upper ends of the shafts, means for rotating the drums to wind the cables on the drums to raise the forward end of the frame, and a rotary cutting member supported on the frame for cutting vegetation over which the machine is moving.

In testimony that I claim the foregoing as my own, I have hereto affixed my signature.

ARCHIE ROWLEY.